United States Patent [19]

Thom et al.

[11] Patent Number: 4,794,879
[45] Date of Patent: Jan. 3, 1989

[54] KENNEL DRAINAGE SYSTEM

[76] Inventors: Jerry D. Thom, 773 E. 9630 South, Sandy, Utah 84070; Vincent P. Schaaf, 2639 S. 1100 East, Salt Lake City, Utah 84106

[21] Appl. No.: 36,795

[22] Filed: Apr. 10, 1987

[51] Int. Cl.⁴ .............................................. A01K 1/01
[52] U.S. Cl. ...................................... 119/17; 119/28; 52/169.5
[58] Field of Search .................. 119/17, 19, 27, 28; 404/2; 210/163, 164; 52/169.5

[56] References Cited

U.S. PATENT DOCUMENTS

| | | | |
|---|---|---|---|
| 1,947,698 | 2/1934 | Corbin, Jr. | 119/29 |
| 2,516,961 | 8/1950 | Dailey | 119/28 X |
| 2,979,027 | 4/1961 | Corwin et al. | 119/27 X |
| 4,135,339 | 1/1979 | Pawlitschek | 119/28 X |
| 4,460,462 | 7/1984 | Arneson | 210/163 |

Primary Examiner—Robert P. Swiatek
Attorney, Agent, or Firm—Trask, Britt & Rossa

[57] ABSTRACT

An animal cage having a floor and a plurality of upstanding walls mounted on that floor, about its perimeter, is disclosed. The floor is inclined toward a central region thereof which defines an elongate drain channel. Mounted within the channel is a generally "T"-shaped baffle plate adapted to direct excrement from the floor into the drain channel. A door fitted partition wall is slidably mounted over the baffle plate.

22 Claims, 4 Drawing Sheets

KENNEL DRAINAGE SYSTEM

BACKGROUND OF THE INVENTION

1. Field: This invention is directed to animal cages. More particularly, the invention relates to a novel drainage system for animal cages.

2. Statement of the Art: Animal cages of various types and constructions have been known for centuries. In many respects, contemporary cage structures differ very little from those utilized hundreds of years ago.

In a conventional construction, an animal cage includes a floor and a plurality of upstanding walls mounted to the floor. The walls are joined one to another at their vertically oriented edges to define a pen which encloses an interior housing area. The cage may or may not include a roof. Oftentimes, the need for a rod is obviated by construction to be of a sufficient height to preclude the animal's escape by jumping over the walls. In other constructions, a roof is mounted on the top of the walls, thereby defining an all-enclosing structure of the interior housing area.

A critical problem inherent in all cage constructions is the maintenance of sanitary conditions within the cage. Of critical importance is the proper disposal of excrement which may accumulate on the floor during the period of an animals's retention.

Conventional cage floor construction materials may include earth, a permeable mesh, e.g., a grid structure or a solid slab of material, which may be impermeable. Those cages which have an earthen floor utilize the porous characteristics of the soil to absorb, in large part, the liquid portion of the excrement. The solid portions of the excrement must be removed manually. Since the earthen floors retain a portion of the excrement, this type of construction is disfavored because of the probability of disease, virus, and germs being incubated within that excrement and thereafter being transmitted to the housed animal. It is generally considered that earthen floors create an environmental hazard which may imperil the health of the housed animal.

The cage constructions, which utilize a mesh or grid-like floor, allow for the excrement to be directed downward through the floor to a ground surface positioned beneath the floor. This type of construction is represented by the cages disclosed in U.S. Pat. Nos. 3,292,582 (Rubricius); 3,698,360 (Rubricius); 3,098,465 (Ivey); 3,177,848 (Rubricius); 3,292,582 (Rubricius); and 1,840,202 (Kear). In order to avoid the disease breeding potential, as outlined above regarding earthen floors, the floor must be positioned sufficiently above the ground surface to hinder the transmission of germs and virus upward through the permeable floor. Further, access must be provided to the underlying ground surface for cleaning purposes. The construction of a cage, which is raised above such an underlying ground surface, inherently involves considerable complexity and expense in construction.

The most common animal cage floor construction includes a solid floor panel which is generally impermeable to liquid. Often, this floor is constructed f steel or concrete. Typical examples of this mode cf construction are those shown in U.S. Pat. Nos. 3,087,458 (Bennett); 3,318,285 (Betham); 3,550,558 (Sachs); 2,523,615 (Fell); and 4,057,032 (Dimitriadis).

To facilitate the cleaning of such floors, it is a conventional practice to slope the floor from the rear of the cage downwardly to the front of the cage. An open drain canal is positioned contiguous the front wall of the cage. Any excrement deposited on the floor is induced by gravity to flow downward toward the front of the cage and thereby flow into the drain canal.

Conventional kennels generally include a plurality of the cages heretofore described. These cages are typically arranged in banks, i.e., side by side and back to back, forming an elongate, linear array of cages. One drain canal typically runs the full length of the array and thereby receives and disposes of the waste products which drain from each respective cage.

Understandably, a major portion of the excrement, due to its material composition, does not flow naturally into the drain canal. This condition requires that an external cleaning effort be effected. In the most common case, an individual must enter the cage with a hose and spray the floor with a stream of water.

To clean the cage, an individual generally must wash down the floor starting at the rear of the cage and thereafter proceeding toward the front of the cage. In most cage structures, this cleaning procedure requires the individual to actually enter the cage and walk to the rear of the cage.

An individual entering a cage to perform such a cleaning operation confronts a number of difficulties. First, the individual generally comes into direct contact with the housed animal. Many of the animals housed in kennels are diseased. Further, many animals are subject to fits of distemper. As an individual enters the cage for cleaning purposes, that individual is exposed to contagions, and the possibility of physical injury resulting from animal attacks.

Secondly, the material composition of excrement is such that upon its being impacted by a stream of water, it oftentimes is scattered in all directions, often reaching an almost atomized condition. Since the animal and the individual are typically in close proximity to the excrement, they are commonly covered with a layer of moistened excrement. Observably, this condition is unhealthy to the individual as well as to the animal.

It should be understood that animals retained in kennels are generally prone to contracting disease. These animals are seriously weakened by the considerable stress created by their removal from a familiar environment and subsequent placement in an unfamiliar environment. Further, the animals are suddenly placed among a number of unfamiliar and often vicious animals. Many of the animals placed in kennels are already diseased. The high rate of transmission of disease within kennels is very well known. Therefore, to substantially wet the already weakened animal down with excrement ladened water, which excrement may be that of an adjacently housed diseased animal, can only be viewed as increasing dramatically the likelihood that the excrement soaked animal will contract a disease.

Not only is the probability of the animal contracting a disease increased markedly, but the likelihood of the individual contracting a disease is also increased immeasurably. Furthermore, the nature of these working conditions make the task of cleaning the kennels a highly undesirable task.

SUMMARY OF THE INVENTION

The animal cage of the instant invention includes a floor and plurality of upstanding walls positioned about the perimeter of that floor. The walls are connected to one another along their vertical edges to form a pen-like structure. The association of the walls and the floor define an enclosed interior housing area for retaining an animal.

In one embodiment, a first upstanding wall defines an opening therein, in which is pivotedly fitted an openable and closeable door. The floor is inclined, i.e., sloped or pitched away from the door, downward toward a second upstanding wall positioned opposite the first door-defining wall. Contiguous to the juncture of this second wall and the floor, an elongate, open drain channel is defined in the floor surface. This drain channel extends along the complete length of the second wall. The channel has a bottom. The bottom of the channel is positioned elevationally lower than the top surface of the floor. Preferably, the bottom of the channel is inclined whereby fluid received therein is directed by gravity to one end of the channel.

Positioned in the channel is a baffle plate. In one construction, this plate has a generally inverted "L" shaped configuration. The baffle plate includes a generally upright first panel which extends the full length of the channel. The baffle plate abuts against the sidewalls of the cage at each of its ends. The upright panel forms a barrier. During the cleaning of the floor, a stream of water is directed onto the floor. The water, together with any excrement on the floor, is driven by the stream of water and by gravity along the inclined floor surface and is impacted against the barrier. Mounted on the top of the first panel is an outwardly extending second panel. In preferred constructions, this second panel intersects the first panel generally perpendicularly. The second panel extends over the floor and into the interior area of the cage. The second panel is positioned above the floor a sufficient height that excrement may pass unobstructed between the second panel and the floor, and thereafter enter the drain channel. Preferably, the entrance to the drain channel, i.e., the opening between the second panel and the floor, is sized to preclude the animal's accessing the drain channel and the refuse contained therein. This provision hinders the transmission of excrement-carried disease germs to the housed animal.

In a preferred embodiment of the invention, the floor defines a central region, which may be located midway between the first and second upstanding walls. Instead of the floor being inclined from the first wall to the second wall, the floor is inclined or sloped downward from both the first and second walls to this central region. In one embodiment, this inclined floor surface defines two planar panels which intersect in this central region along a linear configured junction. At this linear junction, an elongate, open-topped drain channel is constructed below the surface of the floor. In cross section or side view, this preferred floor construction presents a "V"-shaped configuration wherein the angle, or nadir, of the "V" defines the drain channel. The drain channel is constructed to be elevationally lower than the two floor surfaces.

The drain channel includes a bottom and a pair of oppositely positioned sidewalls. A baffle plate having a generally "T"-shaped cross section is mounted within the drain channel and is positioned upright therein. The baffle plate is elongate and extends along the complete length of the channel. The baffle plate abuts against the sidewalls of the cage, contiguous each end of the plate. Each of the ends of the baffle plate intersect the perimeter of the cage.

The baffle plate includes an upright first planar panel which is preferably positioned within the central region of the channel to symmetrically divide the channel in two. The first panel forms a splash plate for water carried excrement which may be directed along the floor from the direction of either the first or second wall. The excrement impacts against the first panel and thereafter falls downwardly into the drain channel.

Mounted, preferably detachably, on the top of the first panel is a second elongate panel. This second panel is positioned generally in a horizontal orientation whereby the second panel extends outwardly both toward the first as well as toward the second wall. This second panel extends over the open top of the drain channel and preferably extends generally parallelly over the floor surface. The second panel and the floor, together with the sidewalls of the cage, define an opening dimensioned to permit excrement to pass therethrough. The second panel may include a plurality of legs or supports which extend downward to the floor and serve to support the second panel in its horizontal positioning.

Positioned upright atop the second panel is a slidably removable, partition wall. This partition wall abuts against the sidewalls of the cage located proximate each end of the partition wall. The partition wall thereby divides the interior housing area of the cage into two distinct and separated compartments. This otherwise solid partition wall defines an opening dimensioned to permit the passage therethrough of the housed animal. Thus, the animal may move from one compartment to another. The opening may be fitted with an openable-closeable door. The opening is preferably positioned to intersect the lower perimeter of the partition wall. When the door is opened, the animal may walk over the second panel and through the opening, i.e., the second panel forms a floor or bridge beneath the door opening and over the drain channel.

It should be understood that the invention lends itself to being assembled in arrays, i.e., a plurality of cages being positioned adjacent one another side by side. In such arrays, the drain channel may extend along the complete length of the array and operate to drain excrement from each cage.

The sidewalls of the cage may be of solid construction. This provision retards any refuse from being directed into adjacent cages as water is directed into the cage being cleaned. The first and second wall may be solid or perforated. The perforated construction permits an individual to stand outside of the cage and direct a stream of water through the wall itself onto the floor to be cleaned. Observably, this facilitates an individual's cleaning of the cage without ever entering the cage.

Typically, a water supply is installed at the inclined end of the drain channel, whereby water may be directed along the length of the drain channel to assist in driving the excrement to a waste site at the end of the drain channel.

The invention provides an improved structure which facilitates a more rapid and safe cleaning operation while substantially minimizing the risks of disease transmission to both the caged animal and the individual performing the cleaning. When cleaning is desired, the animal is passed through the partition wall into the second compartment which is not to be initially cleaned. The door in the partition is then closed. The user then may spray down the floor of the first compartment from a position outside of that first compartment.

Resultingly, the excrement is driven down the incline of the floor to the opening between the second panel and the floor; thereafter it passes through that opening and either impacts against the baffle plate and falls into the drain channel or it may falls directly into the drain channel. Due to the sloped bottom of that drain channel and the stream of water being directed along that channel, the excrement flows, i.e., is driven, along the channel to an external waste site. Due to the baffle plate and specifically the first panel, excrement from the floor of the first compartment is prevented from accessing the second compartment which presently houses the animal. The user may thereafter repeat the operation with respect to the second compartment, i.e., transferring the dog through the partition wall, closing the door and thereafter spraying down the second compartment. Observably, the animal is isolated from the drain channel as it walks over the bridge provided by the baffle plate.

Utilizing this invention, each compartment may be thoroughly cleaned while the animal is not sprayed by either the water nor the excrement. Furthermore, the excrement from adjacent cages may be substantially prevented from contaminating the housed animal.

DETAILED DESCRIPTION OF THE DRAWINGS

Figure 1:
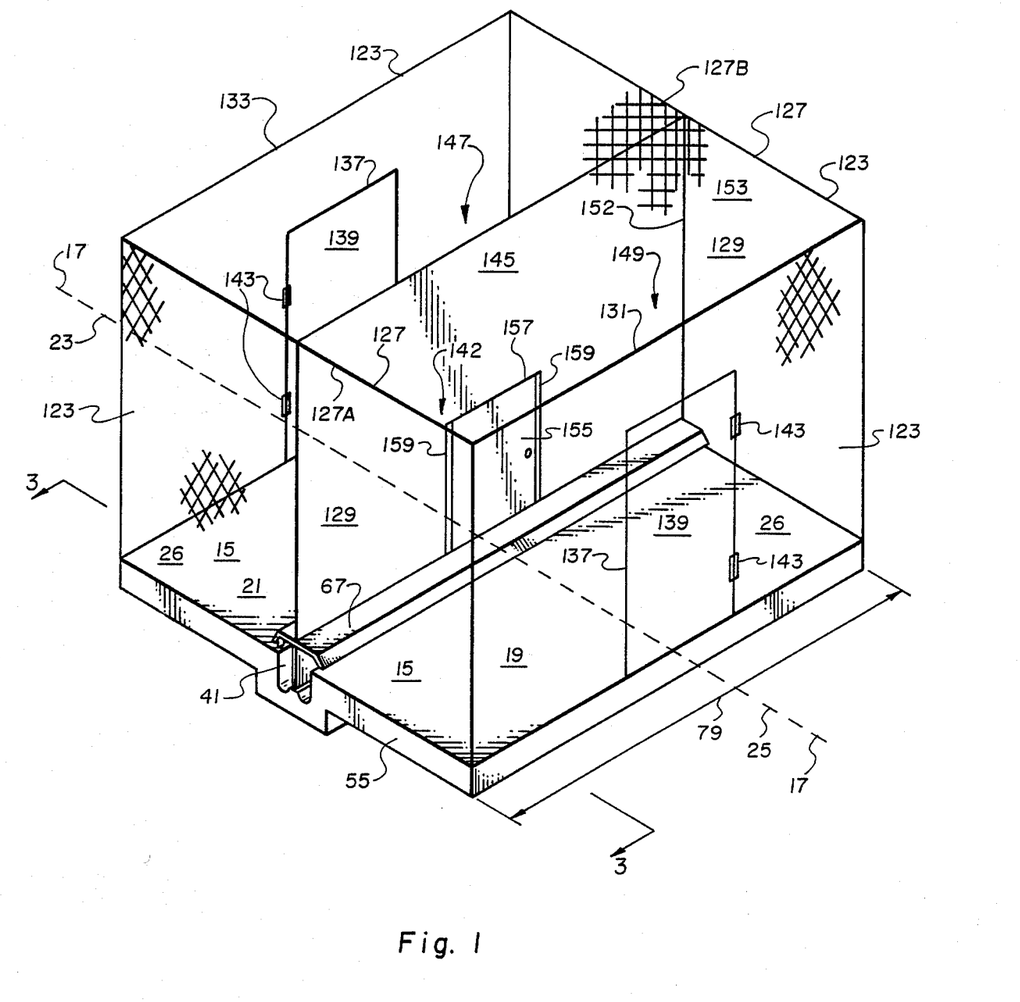
FIG. 1 is an elevational perspective view of an individual animal cage of the instant invention.
Figure 2:
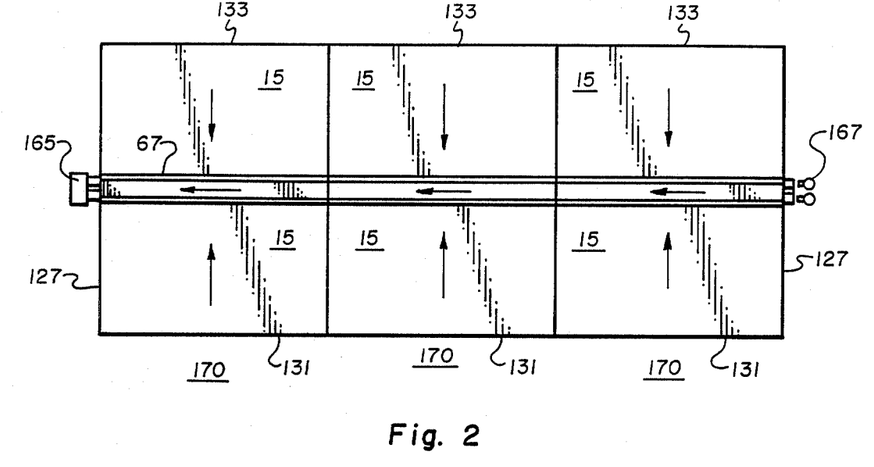
FIG. 2 is a top plan view of a plurality of animal cages of the invention.
Figure 4:
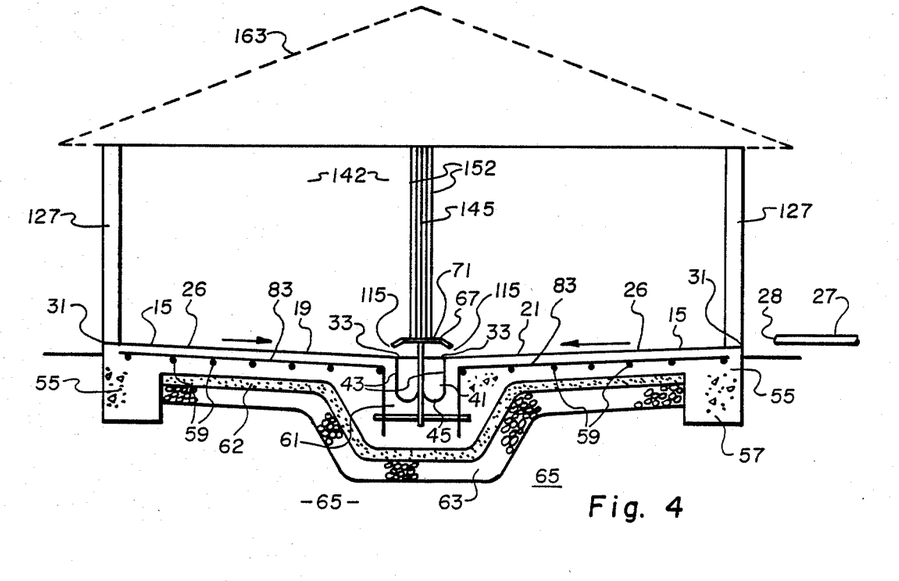
FIG. 4 is an elevational cross-sectional side view of an individual animal cage of the instant invention.

As shown in FIGS. 1, 2 and 4, an animal cage cf the invention includes an elongate impermeable floor 15 having a longitudinal axis 17. This floor 15 may be defined by two floor panels 19 and 21, which are oriented to have their respective axes 23 and 25 colinear with the longitudinal axis 17. Preferably, each panel 19 and 21 is planar in configuration and may be generally quadrilateral, e.g., rectilinear, in plan view.

The planar surface 26 of each panel 19 and 21 is oriented inclined from the horizon 27 by an angle 28. The front edge 31 of each panel 19 and 21, which is positioned on the perimeter of the cage, is positioned elevationally higher than an oppositely positioned interior edge 33. Edges 33 as well as edges 31 are linear in configuration and are oriented parallel to the horizon 27. As shown in FIG. 4, the association of the surfaces 26 of panels 19 and 21 define a generally "V" shaped configuration when viewed from the side, i.e., in side cross section. The interior edges 33 of the respective floor panels 19 and 21 are separated one from another by an elongate drain channel 41.

As shown in FIG. 4, this drain channel 41 has a generally "V" or "U"-shaped cross-section which remains substantially constant over the length of the channel 41. The channel 41 consists structurally of two parallelly positioned upright sidewalls 43 and a bottom 45. Preferably, bottom 45 is inclined from the horizon 35, whereby fluid deposited within the channel 41 is urged by gravity to flow from one end 47 of the channel 41 to the opposing end 49. As shown in FIG. 2, the bottom of the channel 41 is inclined from the horizontal 27 by an angle 53. Angle 53 is preferably between approximately one to two degrees.

As shown in FIG. 4, floor 15 may be constructed to include a layer 55 of concrete or cement 57 reinforced by steel or iron rods 59. The central region 61 of the layer 55 includes a substantially "V"-shaped region configured to form and support the drain channel 41. Positioned below the layer 55 is a layer 62 which may be composed of sand or fine gravel. A layer 63 is positioned below layer 62 and may be composed of gravel. The layer 63 is supported by the ground or earth 65.

Figure 5:
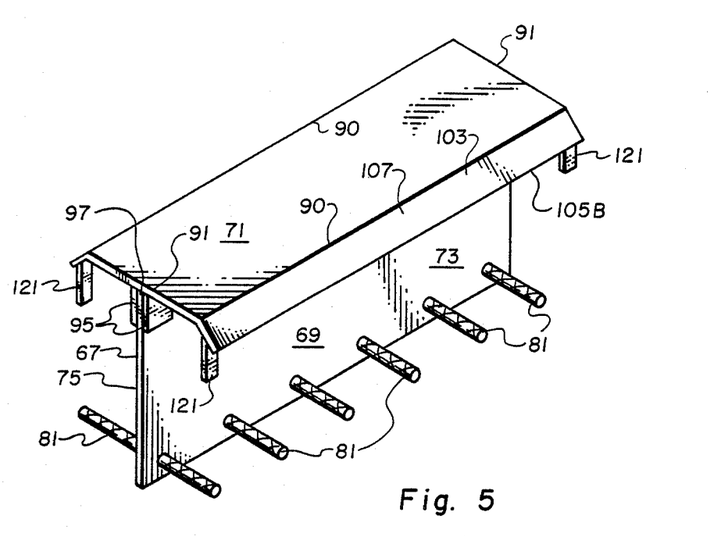
FIG. 5 is an elevational perspective view of a "T" shaped baffle plate of the invention.

Positioned within drain channel 41 is an elongate baffle plate 67. As illustrated in FIG. 5, this baffle plate 67 includes an elongate upright, i.e., vertical, first panel 69 which is fitted with a generally horizontally mounted second panel 71. Preferably, panel 69 is a quadrilaterally (e.g., rectangular) shaped panel having opposing planar faces 73 and 75. The length 77 of panel 69 is dimensioned to be approximately equal with the width 79 of the floor surface 26. In other words, the panel 69 is dimensioned to be received with drain channel 41 and extend along the complete length of that channel within the animal cage 14.

Figure 6:
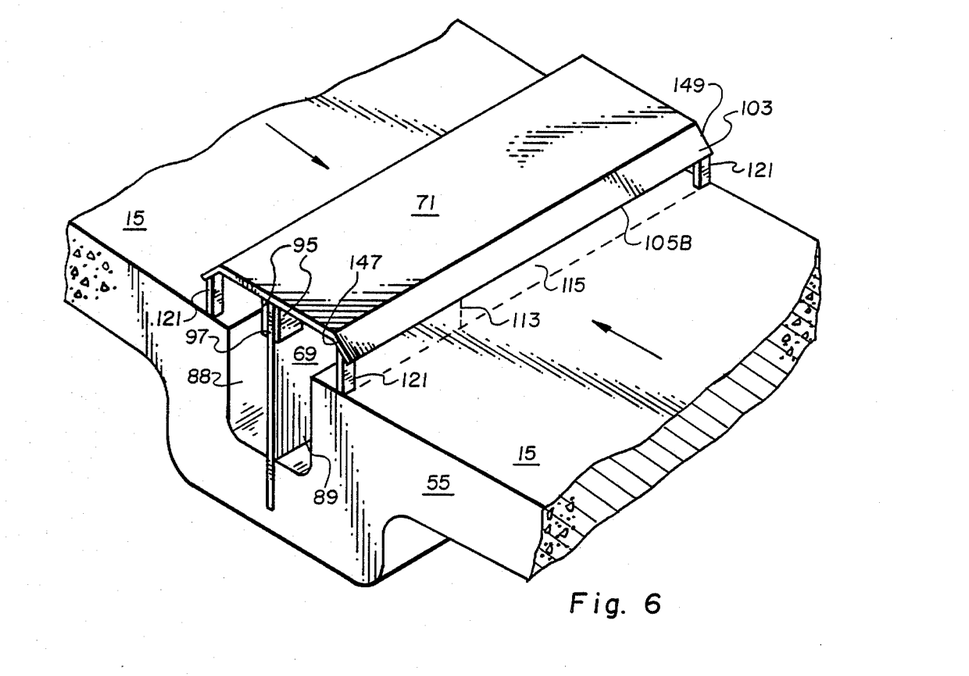
FIG. 6 is an elevational perspective view of a drain channel positioned within the floor and drain channel of an animal cage.

Mounted within panel 69 are a plurality of supports 81. These supports 81 extend outwardly from the faces 73 and 75 of the plate 69 and are adapted to be positioned within the layer 55 of floor 15 to provide a stabilizing support of the panel 69. As shown in FIG. 4, these supports 81 may be linked by reinforcing rod 83 to the horizontally-oriented reinforcement rods 59. As shown in FIGS. 4 and 6, the lower portion of the plate 69 is inserted and set into concrete layer 55. The plate 69 is thereby securely retained in an upright orientation within the channel 41. Preferably, the plate 69 is positioned to divide symmetrically the channel 41 in half, i.e., that portion 88 of the channel 41 on one side of the plate 69 is dimensioned and shaped to be substantially identical to that portion 89 of the channel 41 on the opposing side of the plate 69.

Figure 7:
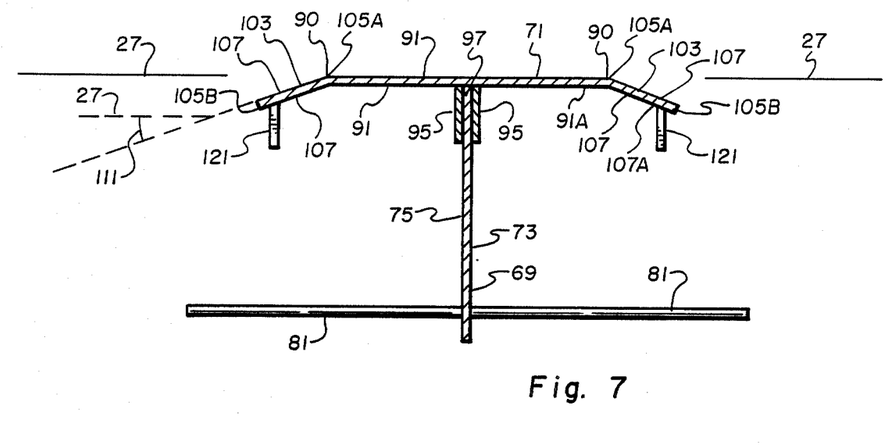
FIG. 7 is an end view of the "T" shaped baffle plate shown in in FIG. 5.
Figure 8:
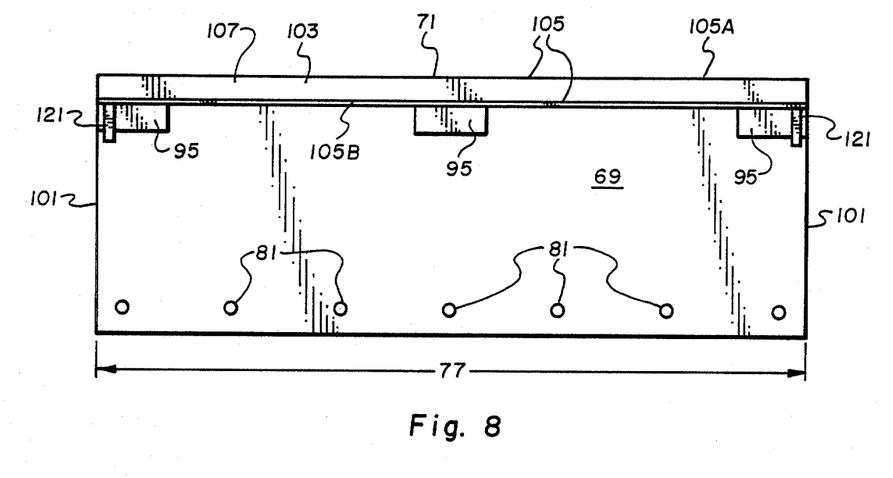
FIG. 8 is a side view of the baffle plate shown in FIG. 5.

Second panel 71 is a generally quadrilateral (e.g., rectangular) shaped member having a pair of oppositely positioned edges 90. The panel 71 includes two planar, opposingly-positioned faces 91, which faces are positioned parallel to the horizon 27. A plurality of brackets 95 are positioned on the downwardly directed face 91A. The brackets 95 are arranged in pairs with each pair defining a channel 97 therebetween. Each channel 97 is dimensioned to slidably receive an upper portion of the panel 69, as shown to advantage in FIGS. 5-7. The brackets 95 permit the second panel 71 to be slidably inserted into or withdrawn from channels 97 thereby allowing the user the capability to remove the second panel from the panel 69 in order to access drain channel 41, e.g., for cleaning or maintenance purposes. As shown in FIG. 8, three pairs of brackets 95 may be placed spacedly along the length of panel 71. Preferably, a pair of brackets 95 are placed proximate the ends 101 of panel 71, and one or more pairs of brackets 95 are positioned at locations between the ends 101.

A third elongate panel 103 is mounted on each edge 89 of panel 71. Each panel 103 is generally quadrilateral in configuration (e.g., rectangular) and includes a pair of oppositely positioned edges 105 which define in part the perimeter of the panel 103. One edge 105A is joined to edge 89 along its complete length. The opposing edge 105B extends outwardly over the floor surface 26. Each panel 103 includes a pair of opposing planar faces 107. The faces 107 are positioned parallel one another. Further, the faces 107 are inclined from the horizontal 27 by an angle 111.

When the panel 71 is mounted on panel 69, the edges 105B are positioned above the surface 26 at a distance or height 113. In preferred embodiments, this distance 113 is between approximately 1½ inches to 2¾ inches, and preferably about 1½ inches. The criteria determining the measurement of distance 113 are the characteristics of the particular animal to be housed in the cage 14. The opening 115 defined between the surface 26 and the edge 105B and extending along the length of panel 103 between ends 147 and 149 of the panel 103 constitutes the access port of the drain channel 41. Preferably, this opening 115 is dimensioned sufficiently narrow to preclude the animal accessing the refuse in the channel through the opening 115. Secondly, the opening 115 must be sufficiently large to permit passage therethrough of the animal's excrement. Given these criteria, the exact dimension of the opening 115 may be determined in the field.

A plurality of supports 121 may be mounted on the faces 107A. These legs 121 extend downward from the panels 103 and rest on the floor surface 26 and thereby support the panel 71 in its horizontal orientation.

The baffle plate 69 may be constructed of a variety of materials. Preferably, the materials chosen exhibit some rigidity whereby the plate so formed is a substantially rigid member. Some materials which may be used are steel, aluminum, and various forms of plastics, e.g., polyvinyl chloride.

FIG. 1 illustrates a plurality of upstanding walls 123 which are mounted about the perimeter 125 of floor 15. As shown, a pair of opposing planar sidewalls 127 are positioned parallel one another about the longitudinal axis 17 of the floor 15. The sidewalls 127 are generally quadrilateral in configuration and include planar faces 129. A front and rear wall, respectively, 131 and 133 are also quadrilateral and planar in configuration and are also parallelly positioned vis-a-vis each other. The sidewalls 127 and the front and rear walls 131 and 133 are joined one to another along their edges in the assembly shown in FIG. 1 to define a generally open, box-like configuration.

The combination of the sidewalls 127A and 127B, the floor 15, the partition wall 145 and baffle plate 69 in each compartment seals the respective first compartment from any communication with the second compartment except through the opening 155. As the first compartment is washed down the water and excrement is precluded from entering the second compartment.

The sidewalls 127 and the rear and front walls 131 and 133 may be fabricated from a variety of materials, e.g., steel, chain-link fencing, fiberglass, epoxy resin, or polypropylene coated foam, or polyester coated polystyrene or polyurethane foam. In preferred embodiments, the sidewalls 127 are constructed to have a solid, non-porous surface, whereas the front and rear walls 131 and 133 have a porous mesh-like configuration.

The front wall 133 defines an opening 137 therein dimensioned to permit the passage therethrough of the animal to be housed within the cage 14. This opening 137 is fitted with a door 139 which is made openable as well as closeable. As shown, door 139 may consist of a planar panel which is pivotally mounted to wall 133 by hinges 143. The rear wall 133 may also include a similar door construction, as shown in FIG. 1.

A partition wall 145 is mounted in the central region of the interior area 142 defined by walls 127, 131 and 133 and floor 15. Partition wall 145 is a planar, quadrilaterally, e.g., rectangularly, configured panel which is dimensioned to extend from wall 127A to 127B and thereby divide the interior area 142 into two compartments 147 and 149. In preferred constructions, wall 145 is a solid panel, i.e., non-perforated or porous. Partition wall 145 is dimensioned to extend to the same height as walls 127, 131 and 133.

In some embodiments, the baffle plate 67 may be mounted to walls 127A and 127B so as to support the panel 71 in its horizontal orientation. The mounting may include adhesives, a bracket with associated bolt and nut fittings adapted to link the plate with the walls. In this construction, the need for legs or supports 121 is obviated.

Partition wall 145 is preferably mounted upstanding in a pair of upright channel defining members 152 mounted on the surfaces 153 of walls 127. This construction permits the wall 145 to be slidably inserted and retracted from interior area 142 along a vertically oriented plane. Wall 145 is positioned over and atop second panel 71, as shown in FIG. 4. In typical constructions, the wall may actually rest on and be supported by second panel 71.

Wall 145 defines an opening 155 therein which is dimensioned to permit passage therethrough of the housed animal. The opening 155 generally is defined to be contiguous with the panel 71 when the wall 145 is in position within the channels 152. In this manner, the horizontally oriented panel 71 constitutes a bridge over drain channel 41 over which the animal may walk in passing through opening 155.

The opening 155 may be fitted with a door 157 which is openable and closeable. This door 157 may consist of a guillotine-type construction which includes a planar panel which is displaceable vertically to close or open the opening 155. The guillotine door utilizes a pair of upright channel defining members 159 positioned spacedly apart and proximate the edges 161 of opening 155 to guide the displacement of the door panel 157. Alternate door constructions, e.g., a conventional door panel hinged on its vertical edge, are also employable.

The partition wall 145 is removed from the cage by sliding it upward and out of its retaining channel defining members 152. Once the wall 145 is removed, or even raised somewhat, the second panel 71 may be lifted upwards and away from the first panel 69, thereby allowing access to the channel 41 for cleaning and maintenance purposes. The first panel 69 typically remains fixed in the drain channel 41 due to the concrete bonding with the panel 69.

The cage 14 may or may not utilize a roof 163 (shown in phantom) over the interior area 142. In modified constructions, a roof 163 may be placed over only one compartment of the interior area 142, leaving the second compartment open to the environment.

As depicted in FIG. 2, cage 14 of this invention may be assembled in arrays, such as the side-to-side arrangement shown. In these arrays, the drain channel 41 is continuous along the entire length of the array. In this manner, the excrement from each cage 14 may be directed through a common channel 41 to a single common collection site 165 by a single water source 167. It should be understood that in such arrays, the channel 41 is inclined downwardly continuously along its entire length from the water source 167 to collection site 165 to facilitate drainage.

In single cage embodiments, the drain channel 41 is fitted with its respective water source 167 and collection site 165.

Sewage (i.e., excrement) collected at collection site 165 is directed to an external disposal site (not shown) for treatment. Collection site 165 may consist of a large opentopped basin formed in the floor 15 which basin communicates with channel 41.

Figure 3:
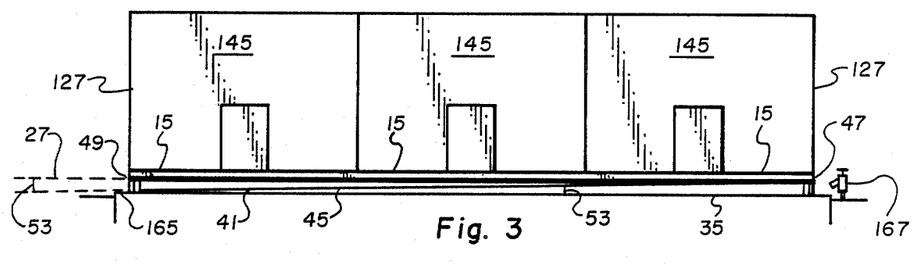
FIG. 3 is a front view of the animal cages shown in FIG. 1.

As illustrated in FIGS. 2, 3, and 4, the instant cage 14 construction permits the user to clean the cage 14, especially the floor 15 thereof, without actually entering the cage itself. First, door 157 is opened and the animal is directed through opening 155 into the compartment which is not to be initially cleaned. The door 157 is subsequently shut. Next, water source 167 is activated which sends a stream of water flowing down drain channel 41 toward collection site 165. The flow of water operates to scour the channel 41 and direct any excrement received in that channel toward the collection site 165.

Subsequently, the user may spray the floor 15 of the compartment to be cleaned through the mesh or grill-like front wall 131, or in the case of a solid front wall 131, through opening 137 or over the top of wall 131. The user never need actually enter the interior area 142 of the cage 14. Since the user may stand at a location, generally 170, outside of the cage 14, the likelihood of fecal matter being sprayed onto the user's person is substantially reduced, if not eliminated. As the floor 15 is irrigated by the spray, the excrement flows downward along the incline of the floor eventually passing through opening 115 and thereafter falling into drain channel 41. After reaching the drain channel 41, the excrement and water from the spray are directed along the channel 41 by the water stream originating at water source 167. The first panel 69 precludes the excrement from entering the second compartment after it has passed through opening 115. The edge 105B is positioned sufficiently above floor surface 26 so that the likelihood of excrement being driven over and above that edge 105B is minimal.

Since walls 127A, 127B and 145 are preferably solid panels, i.e., non-permeable, and further, since those walls form a sealed "V"-shaped structure which is substantially sealed to the floor 15, the possibility of excrement passing from the first compartment into the second compartment is highly unlikely.

After the first compartment has been thoroughly cleaned the animal is returned through opening 155 into the first compartment. As the animal walks through opening 155, the panel 71 forms a path or bridge over the drain channel 41 such that the animal does not contact the refuse in that channel. The user can then clean the second compartment by repeating the process heretofore described for cleaning the first compartment.

It should be understood that the invention provides a means whereby the cage's interior, and specifically the floor thereof, may be cleaned without the individual doing the cleaning having to enter the cage, thereby minimizing the possibility of his contacting the fecal matter or encountering a vicious animal. Further, the likelihood that the animal will be sprayed or be covered by water containing fecal matter is substantially reduced, if not eliminated. The likelihood of disease being transmitted to an animal by the fecal matter of adjacently housed animals is substantially reduced since each cage is substantially isolated from neighboring cages.

The embodiments herein described are merely illustrative of the principles of the invention. Reference herein to the details of the illustrated embodiments is not intended to limit the scope of the claims, which themselves recite those features regarded as essential to the invention.

We claim:

1. An animal housing unit comprising:
an elongate, open-topped channel drain having a longitudinal axis, said drain having an opposing first and second ends, said drain being sloped wherein said first end is elevationally higher than said second end;
a pair of planar floor surfaces mounted contiguously to said channel drain, said floor surfaces being positioned opposite one another about said drain, each floor surface having a first edge, an oppositely positioned second edge, a third edge and an oppositely positioned fourth edge, said first edge being positioned contiguously to said drain, each said second edge being oriented elevationally higher than its respective said first edge wherein an association of said floor surfaces with said drain defines a "V"-shaped profiled construction, wherein sewage resting on said floor surfaces is induced by gravity to flow into said drain;
an upright, planar rigid first panel mounted within said drain and positioned to extend upwards beyond said open top of said drain, a plane of said first panel being positioned parallel said longitudinal axis;
a planar, horizontally positioned, rigid second panel detachably mounted perpendicularly on said first panel, said second panel being dimensioned to extend laterally beyond said open top of said drain and over said floor surfaces, each said floor surface and said second panel defining an opening therebetween dimensioned to permit passage therethrough of fecal matter flowing to said channel drain while precluding said animal from accessing said channel drain through said opening, said second panel having oppositely positioned first and second sides;
a plurality of support legs, said support legs being mounted on said first side of said second panel and extending from said first side to abut against a respective said floor surface, wherein said legs support said second panel above said floor surface and said drain;
a plurality of upstanding sidewalls mounted on each of said second, third and fourth edges of each floor surface, said sidewalls being connected one to another to thereby define a quadrilaterally cross-sectioned, open-topped containment structure;
a center wall mounted atop said second panel and extending vertically upwards, said center wall defining a pair of compartments within said containment structure, said center wall defining an aperture therein which intercommunicates with said two compartments, said aperture being positioned contiguously to said second panel, said aperture being dimensioned to permit passage therethrough of an animal, wherein said second panel forms a floor and a bridge over said channel drain over which said animal may walk in passing through said aperture; and a door slidably associated with said center wall for closing and opening said aperture.

2. The animal housing unit of claim 1 wherein a roof is mounted on said sidewalls enclosing said containment structure.

3. The animal housing unit of claim 1 wherein a plurality of outwardly extending shafts are mounted on a lower region of said first panel, said shafts extending into said floors to form a stabilizing support for said first panel.

4. The animal housing unit of claim 1 wherein said second panel includes a pair of elongate planar plates mounted thereon, said plates being mounted to define an elongate open-sided first channel therebetween, said first channel being dimensioned to slidably receive and releasably retain an upper end of said first panel.

5. The animal housing unit of claim 1 wherein said first panel divides said channel drain into two segregated channel drains.

6. An animal cage comprising:
an impermeable floor having a perimeter which includes a first end and an oppositely positioned second end, said floor defining a central region positioned between said first and second ends, said first end and second end being elevationally higher than said central region, said floor being inclined from said ends toward said central region;
an elongate open drain defined within said central region of said floor, said drain dividing said floor into a first floor surface including said first end, and a second floor surface including said second end;
an upright elongated first plate mounted within said drain extending along a length of said drain, said first plate extending upwardly out of and above said drain;
an elongate second plate mounted orthogonally on said first plate to extend horizontally over said drain, said second plate extending along said length of said drain, said second plate extending outwardly above and over said central floor region, said second plate in association with said central floor region defining a pair of vertically oriented openings therebetween, each opening leading to a respective drain channel, one of said openings being positioned on each of two opposing sides of said first plate;
a plurality of upstanding sidewalls mounted on said floor perimeter defining an open-topped enclosure, said sidewalls defining an accessway into said enclosure;
wherein fecal matter deposited on said floor proximate said first end of said floor is induced by gravity to flow to a first said drain channel and wherein fecal matter deposited on said floor proximate said second end of said floor is induced by gravity to flow to a second said drain channel, said first plate and said second plate precluding said fecal matter from passing from one floor surface to another floor surface, said second plate constituting a bridge over said drain whereby an animal confined within said cage may pass from, said first floor surface to said second floor surface.

7. The animal cage according to claim 6 wherein the drain has a proximal end and a distal end, said proximal end being positioned elevationally higher than said distal end such that fecal matter within said drain is directed by gravity from said proximal end toward said distal end.

8. The animal cage according to claim 6 wherein a partition wall is detachably mounted within said enclosure.

9. The animal cage according to claim 8 wherein said second plate is detachably mounted to said first plate, said second plate being removable from said first plate to facilitate access to said drain.

10. The animal cage according to claim 6 wherein said second plate and said floor in association with said sidewalls define an inlet to said drain, said inlet being configured to permit passage of fecal matter to said drain while precluding an animal from accessing said drain.

11. The animal cage according to claim 6 wherein a door-fitted opening of a partition wall is positioned contiguously to said second plate, said second plate constituting a bridge over said drain on which an animal may walk in passing through said opening.

12. The animal cage according to claim 6 wherein said drain is oriented parallel to said first and second ends.

13. The animal cage according to claim 6 wherein said sidewalls mounted on said first end and on said second end are constructed to be porous.

14. In an animal cage, a baffle plate adapted for placement within an open defined within a floor surface of said animal cage, said baffle plate comprising:
an elongate upright first panel, said first panel being adapted for upright placement within an elongate open drain to extend along a length of said open drain, said first panel having a height dimensioned to exceed a depth of said open drain;
a second panel mounted orthogonally atop said first panel, said second panel being adapted to extend laterally over said open drain to substantially cover said open drain, said second panel being orientable sufficiently above said floor surface to define an opening between said second panel and said floor surface of sufficient dimension to permit a passage therethrough of fecal matter into said open drain, said opening being dimensioned to preclude an animal positioned proximate said second panel from accessing said open drain through said opening;
wherein fecal matter being driven along said floor surface by a cleaning medium may enter said opening, impact against said first panel and thereafter drop into said open drain, said first panel operating to arrest any further forward displacement of said fecal matter.

15. The baffle plate according to claim 14 wherein a plurality of support legs are mounted on said second panel to extend downwardly therefrom and contact said floor surface, said support legs supporting said second panel above said floor surface.

16. The baffle plate according to claim 14 wherein said first panel is supported by a bottom surface of said drain channel.

17. The baffle plate according to claim 14 wherein said plate further includes a solid wall panel mounted atop said second panel and extending vertically upright therefrom, said first panel and said wall panel constituting a vertical surface for arresting forward displacement of fecal matter directed thereagainst.

18. The baffle plate according to claim 17 wherein said wall panel is detachably mounted atop said second panel.

19. The baffle plate according to claim 13 wherein said wall panel defines an openable and closeable door therein which permits passage of an animal through said wall panel, said second panel defining a floor beneath said door.

20. A baffle plate adapted for placement within an open drain defined by a floor surface of an animal cage, said baffle plate comprising:
   an elongate plate means adapted for upright placement within an elongate open drain, and extending upwardly out of said open drain, defining an upright impact surface for arresting a forward displacement of sewage above and over said open drain;
   a cover means mounted atop said plate means for extending over said open drain and substantially covering same, said cover means in association with said floor surface defining an upright opening dimensioned to permit a passage of sewage therethrough into said open drain while simultaneously hindering an animal positioned proximate said cover means from accessing said open drain through said opening.

21. The baffle plate according to claim 20 wherein said association of said plate means and said cover means defines two openings positioned on opposing sides of said baffle and adapted to receive sewage from opposite directions and direct said sewage to said open grain while hindering animal accessibility to said open drain.

22. The animal cage according to claim 20 wherein a solid partition wall is mounted within said enclosure and positioned atop said second plate, said partition wall dividing said enclosure into a first compartment and a second compartment, said partition wall including a door-fitted opening therein which interconnects said compartments, said partition wall in association with said first plate and second plate constituting means of precluding fecal matter driven over said first floor of said first compartment from passing into said second compartment whereby an animal within said first compartment can be transferred into said compartment through said door while said first compartment is cleaned and fecal matter within said first compartment is prevented from passing into said second compartment during said cleaning.

* * * * *